United States Patent
Fujita et al.

[11] Patent Number: 5,907,438
[45] Date of Patent: May 25, 1999

[54] IMAGING DEVICE

[75] Inventors: Kazuhiro Fujita, Machida; Toshihiro Kanematsu, Atsugi; Shigeyoshi Misawa, Tokyo; Ikuo Maeda; Takahito Uga, both of Sagamihara; Hiroyuki Inoue, Yokohama, all of Japan

[73] Assignee: Ricoh Company, Ltd., Tokyo, Japan

[21] Appl. No.: 08/790,601

[22] Filed: Jan. 29, 1997

[30] Foreign Application Priority Data

| Jan. 30, 1996 | [JP] | Japan | 8-014432 |
| Jul. 16, 1996 | [JP] | Japan | 8-206573 |
| Sep. 25, 1996 | [JP] | Japan | 8-274260 |

[51] Int. Cl.$^6$ ............................ G02B 17/00; G02B 27/10
[52] U.S. Cl. ...................... 359/619; 359/622; 359/627; 359/726
[58] Field of Search .................... 359/619, 622, 359/627, 726

[56] References Cited

U.S. PATENT DOCUMENTS

| 4,679,902 | 7/1987 | Inokuchi | 359/619 |
| 5,168,401 | 12/1992 | Endriz | 359/619 |

FOREIGN PATENT DOCUMENTS 5-53245  8/1993  Japan.

*Primary Examiner*—Scott J. Sugarman
*Attorney, Agent, or Firm*—Oblon, Spivak, McClelland, Maier & Neustadt, P.C.

[57] ABSTRACT

An imaging device includes a first focusing element on which rays from an object are incident, a second focusing element from which the rays are emitted toward an imaging surface, and a roof mirror having surfaces which are connected to each other at an angle of 90° so that a ridge line is formed, the roof mirror being arranged so that the ridge line intersects optical axes of the first focusing element and the second focusing element at a position on a plane including the optical axes.

13 Claims, 18 Drawing Sheets

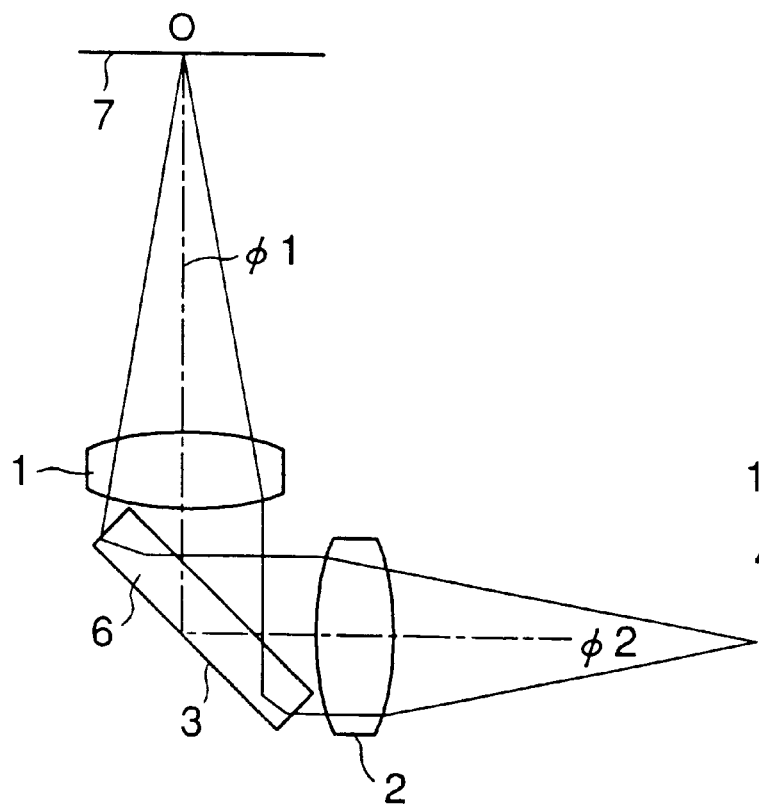
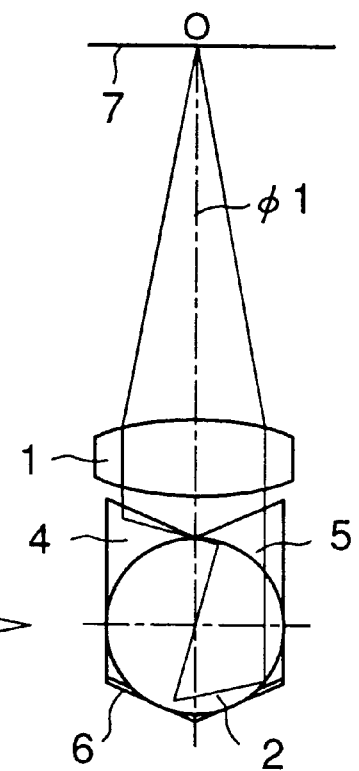
FIG.5A
FIG.5B

IMAGING DEVICE

BACKGROUND OF THE INVENTION

1. Field of the Invention

The present invention generally relates to an imaging device, and more particularly to an imaging device which is applicable to reading optical systems of copy machines, facsimile machines and the like, an optical system of a reading scanner having a CCD sensor and a equimagnification sensor and optical systems of an optical printing head and a self-scanning type optical printing head.

2. Description of the related Art

In the recent years, it is required to miniaturize optical equipment, such as a copy machine and an optical printer head. To satisfy this requirement, a reading optical system and/or a writing optical system of the optical equipment have to be miniaturized. Thus, an equimagnification imaging optical system in which a distance between an object and an image can be strongly reduced is under investigation. The equimagnification imaging optical system is defined as an optical system which forms an image having the same size as an object.

A description will now be given of an example of the equimagnification imaging optical system having a conventional configuration. FIG. 1 illustrates the equimagnification imaging optical system having a conventional configuration. Referring to FIG. 1, a roof mirror lens array 103 is formed as the equimagnification imaging optical system. The roof mirror lens array 103 has a lens array 101 and a roof mirror array 102. The lens array 101 is formed of a plurality of lenses 104 which are arranged in line perpendicular to a a drawing plane of FIG. 1. The lenses 104 are optically equivalent to each other. The roof mirror array 102 is formed of a plurality of roof mirrors 106. The roof mirrors 106 are arranged in line so that each of the roof mirrors 106 faces one of the lenses 104. Each of the roof mirrors 106 has a ridge line 105. The ridge line 105 is perpendicular to a direction in which the roof mirrors 106 are arranged and an optical axis of each of the lenses 104. A stop member (not shown) is provided between the lens array 101 and the roof mirror array 102 so that imaging systems, each of which is formed of one of the lenses 104 and a corresponding one of the roof mirrors 106, are separated from each other.

A reading position P1 of an original 107 is set at a position which is not on the optical axis φ of each of the lenses 104 and corresponds to a finite slit height position. Light reflected from the reading position P1 of the original 107 passes through the each of the lenses 104 so that the light formed of parallel rays. The parallel rays travels to a corresponding one of the roof mirrors 106 and are reflected by the corresponding one of the roof mirrors 106 in the same direction. The light reflected by each of the roof mirrors 106 travels through a corresponding one of the lenses 104 again and is then focused on an imaging position P2 which is optically conjugate to the reading position P1. The position P2 is, for example, on a surface of a CCD sensor 108.

A prism lens array is disclosed in Japanese Patent Publication No.61-2929. Into this inprism lens array, a lens array and a roof mirror lens array are integrated. In the same manner as the roof mirror lens described above, a reading position is set at a position corresponding to a finite slit height position. The light reflected at the reading position travels through each of lenses and is then reflected by each of roof prisms twice. The light reflected by the each of the roof prisms travels through a corresponding one of the lenses again and is focused on an imaging position which is optically conjugate to the reading position.

A roof mirror lens array which is the equimagnification imaging optical system is disclosed in Japanese Laid-Open Patent Application No.57-37326. Into this roof mirror lens array, a lens array, a roof mirror array and a stop member are integrated. The lens array has lenses which are optically equivalent to each other. The lenses are arranged in line. The roof mirror array has roof mirrors. Each of the roof mirrors faces one of the lenses and has a ridge line. The ridge line is perpendicular to a direction in which the lenses are arranged and to an optical axis of each of the lenses. The stop member is provided between the lens array and the roof mirror array to separate imaging optical systems each of which is formed of a corresponding one of the lenses and a corresponding one of the roof mirrors. The roof mirror lens array may be used to read images and for exposure of a photosensitive member.

In each of the imaging devices as described above, a single imaging system is formed of a lens of the lens array and a roof mirror of the roof mirror array. An aperture of the stop member is provided between corresponding lens and roof mirror to optically separate the imaging system from adjacent imaging systems. In this type of the imaging device, the light travels and returns through the lens. Thus, is not possible to locate the reading position and the imaging position at the same position. The light rays travels along the optical axis are separated to an object (the original) side rays and imaging point side rays. Thus, the reading position and the imaging position have to be set based on a finite slit height position. That is, the reading position P1 is set at a finite height position in a direction parallel to the ridge line 105 of each of the roof mirrors 106. The imaging position P2 is set at the finite height position in the reverse direction.

Since the amount of separation of the light rays is limited, separation mirrors 109(1) and 109(2) are used to set the reading position P1 and the imaging position P2 as shown in FIG. 1. The light traveling from the reading position P1 is reflected by the separation mirror 109(1) and travels to a corresponding one of the lenses 104. The light passing through each of the lenses 104 is reflected by the separation mirror 109(2) and focused on the imaging position. Each of the separation mirrors 109(1) and 109(2) is a rectangular plane mirror which expands in a direction perpendicular to the drawing plane of FIG. 1. Each of the separation mirrors 109(1) and 109(2) are arranged so as to be inclined by 45° with respect to a plane including optical axes φ of the lenses 104 of the lens array 101.

In the conventional imaging device having a roof mirror lens or a roof mirror lens array, the light passes through the same lens 104 twice, and the reading position P1 (a reading plane) and the imaging position P2 (an imaging plane) are located in the opposite sides with respect to the optical axis φ of the lens 104. The separation mirrors 109(1) and 109(2) are provided in optical paths between the reading position P1 and the lens 104 and between the lens 104 and the imaging position P2.

The surfaces of each roof mirror and the separation mirrors 109(1) and 109(2) are provided with reflecting films which are formed of high reflecting material, such as aluminum (Al), by a vacuum evaporation process. The reflectivity of each of the reflecting films is about 90%. In the imaging device having the above structure as shown in FIG. 1, there are two reflecting surfaces of each of the roof mirrors 106 and two reflecting surfaces of the respective separation mirrors 109(1) and 109(2). Thus, the total reflectivity of is about 66%. The loss of the amount of light in the imaging device is large.

In addition, in the conventional case, the light pass through the same lens 104 twice, so that the reading position P1 and the imaging position P2 have to be adjacent and to be symmetrical to each other with respect to the optical axis φ. Thus, stray light, such as reflected light from the surface of the lens 104 and from surfaces other than the reflecting surface of the roof mirror 106, may be incident on the imaging position P2 at a high possibility. Such stray light affects characteristics of optical images. In general, the contrast and the resolution of the optical images deteriorate.

Further, FIG. 2 illustrates an essential part of another example of the conventional imaging device. Referring to FIG. 2, the imaging device has a lens array 121 and a roof mirror array 122. Each of roof mirror of the roof mirror array 122 has a ridge line portion 122a between arranged optical axes. A roof mirror lens array is formed of the lens array 121 and the roof mirror array 122.

Each of the roof mirrors of the roof mirror array 122 has two reflecting surfaces which are connected to each other at an angle of 90° so that the ride line portion 122a is formed. However, light L' which is obliquely incident on each lens of the lens array 121 is reflected by a corresponding one of the roof mirrors twice and then ejected from an adjacent lens. That is, the light L' obliquely incident on an optical system is ejected from an adjacent optical system in the imaging device.

SUMMARY OF THE INVENTION

Accordingly, a general object of the present invention is to provide a novel and useful imaging device in which the disadvantages of the aforementioned prior art are eliminated.

A specific object of the present invention is to provide an imaging device in which no separation mirror is needed and a degree of freedom of layout of the imaging position and a degree of freedom of optical design can be improved.

Another object of the present invention is to an imaging device in which it is hard to be affected by the stray light and the loss of the amount of light is small.

The above objects of the present invention are achieved by an imaging device comprising: a first focusing element on which rays from an object are incident; a second focusing element from which the rays are emitted toward an imaging surface; and a roof mirror having surfaces which are connected to each other at an angle of 90° so that a ridge line is formed, said roof mirror being arranged so that the ridge line intersects optical axes of said first focusing element and said second focusing element at a position on a plane including the optical axes.

According to the present invention, the stray light can be substantially prevented from affecting images and the loss of the amount of light in the imaging device can be reduced.

A roof prims may be substituted for the roof mirror.

A first focusing element array, a second focusing element array and a roof mirror array may be respectively substituted for the first focusing element, the second focusing element and the roof mirror.

A roof prism lens array having roof lenses each of which has a first focusing element portion, a second focusing element and a roof prism portion may be substituted for the first focusing element, the second focusing element and the roof mirror.

Another object of the present invention is to provide an imaging device in which light incident on an imaging optical system does not almost affect an adjacent imaging optical system.

The object of the present invention is achieve by an imaging device comprising: a focusing element array having focusing elements which are optically equivalent and arranged in line; a roof mirror array having roof mirrors which are optically equivalent and arranged in line so as to correspond to said focusing elements of said focusing element array, said focusing element array and said roof mirror array being arranged so that an optical axis of each of said focusing elements intersects a ridge line of a corresponding one of said roof mirrors; and a regular reflection preventive structure provided in at least some of ridge line portions, between arranged optical axes, of said roof mirrors of said roof mirror array, said regular reflection preventive structure reducing an amount of light which is incident on a focusing element, reflected by a corresponding roof mirror and emitted from an optical system adjacent to said focusing element.

According to the present invention, incident on an imaging optical system does not almost affect an adjacent imaging optical system.

BRIEF DESCRIPTION OF THE DRAWINGS

Other objects, features and advantages of the present invention will be apparent from the following description when read in conjunction with the accompanying drawings, in which:

FIGS. 5A and 5B are diagrams illustrating a structure of the imaging device according to a second embodiment of the present invention;

DESCRIPTION OF THE PREFERRED EMBODIMENTS

A description will now be given of embodiments of the present invention.

Figure 3A:
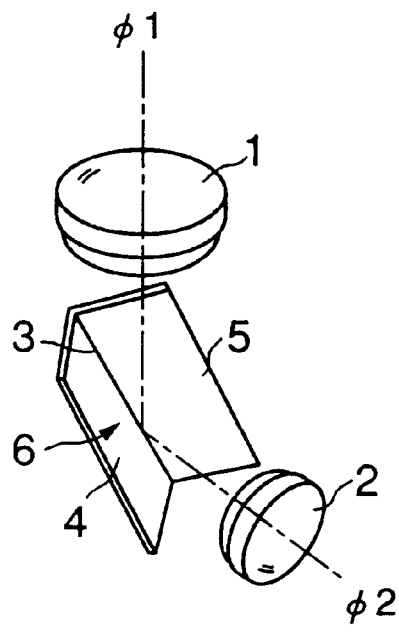
FIGS. 3A and 3B are diagrams illustrating a structure of an imaging device according to a first embodiment of the present invention.
Figure 3B:
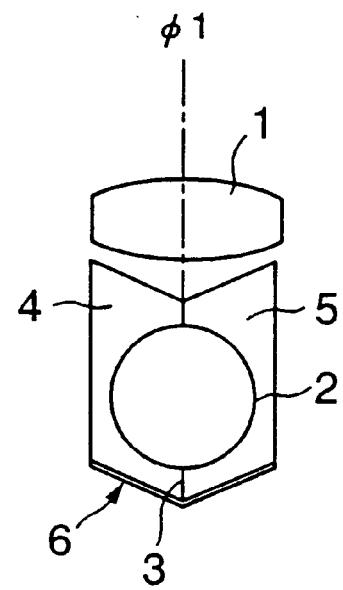

An imaging device according to a first embodiment of the present invention is formed as shown in FIGS. 3A and 3B. Referring to FIGS. 3A and 3B, the imaging device has a first focusing element 1, a second focusing element 2 and a roof mirror 6. The roof mirror 6 has a ridge line 3.

The imaging device is used in an image reading system of an image forming apparatus such as a facsimile machine. The roof mirror 6 is formed of surfaces 4 and 5 which are connected to each other at an angle of 90° so that the ride line 3 is formed. The focusing characteristic of the first focusing element 1 differs from that of the second focusing element 2 (not optically equivalent). The first and second focusing elements 1 and 2 are arranged so that an optical axis $\phi1$ of the first focusing element 1 is perpendicular to an optical axis $\phi2$ of the second focusing element 2. The roof mirror 6 is arranged so that the ridge line 3 is on a plane including the optical axes $\phi1$ and $\phi2$, intersects the optical axes $\phi1$ and $\phi2$ and is inclined at an angle of 45° with respect to the optical axes $\phi1$ and $\phi2$.

In order to use the imaging device having the above structure as the reading optical system, the first focusing element 1 faces a surface of an original and the focusing element 2 faces an imaging surface, such as a surface of a CCD line sensor. That is a normal line of the surface of the original and a normal line of the imaging surface are perpendicular to each other (90°).

A description will now be given, with reference to FIG. 4, of an imaging operation of the imaging device described above.

Figure 4:
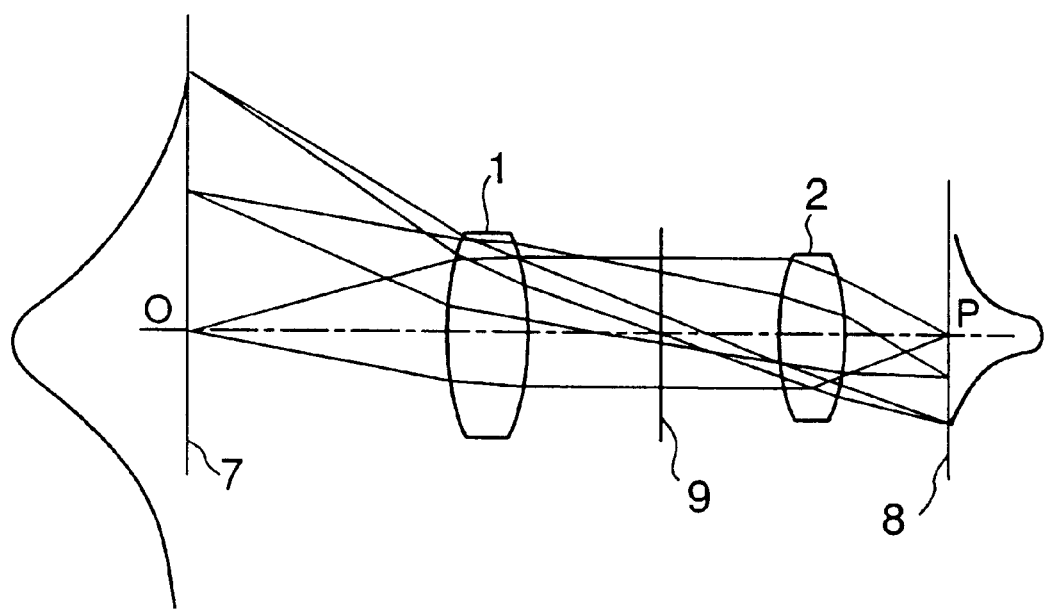
FIG. 4 is a diagram illustrating optical paths in a optical system optically equivalent to the imaging device shown in FIGS. 3A and 3B.

FIG. 4 shows optical paths in an optical system which is optical equivalent to the imaging device shown in FIGS. 3A and 3B. Referring to FIG. 4, the first focusing element 1 faces a surface 7 of an original, and the second focusing element 2 faces an imaging surface 8. Information is located at a position (a reading position O) of the surface 7 of the original, and an imaging position P corresponding to the reading position O is located on the imaging surface 8. An imaginary surface 9 is set between the first and second focusing elements 1 and 2. The imaginary surface 9 corresponds to a plane including the ridge line of the roof mirror 6.

The first focusing element 1 makes rays from the reading position O on the surface 7 of the original be in parallel. The parallel rays from the first focusing element 1 travels through the imaginary surface 9 and are then focused at the imaging position P of the imaging surface 8 by the second focusing element 2. As a result, an image corresponding to the information on the original is formed at the imaging position P.

Figure 1:
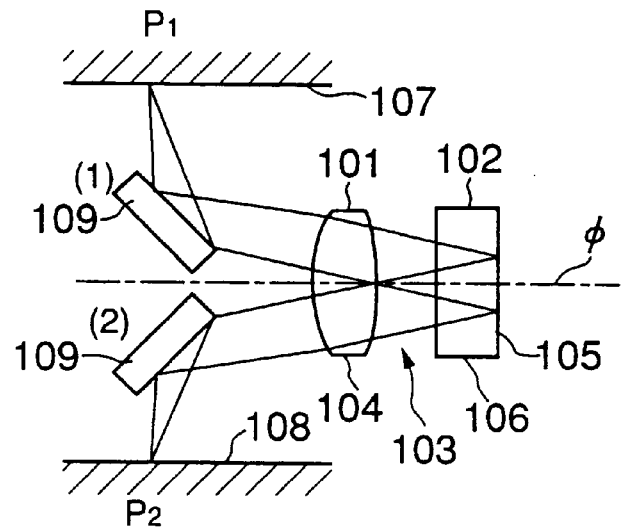
FIG. 1 is a diagram illustrating an example of a conventional imaging device.
Figure 2:
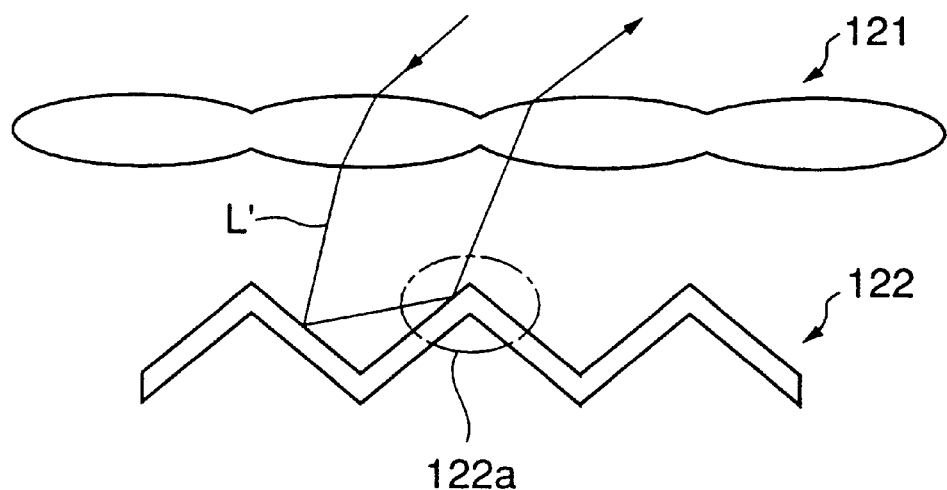
FIG. 2 is a diagram illustrating another example of the conventional imaging device.

In the imaging device as described above, the roof mirror 6 has functions corresponding to the separation mirrors 109(1) and 109(2) of the conventional imaging device (see FIG. 1). Further, the second focusing element 2 which can form the imaging point P is provided apart from the first focusing element 1. Thus, the layout of the imaging position P corresponding to the reading point O can be freely designed.

Further, the normal line of the surface 7 of the original and the normal line of the imaging surface 8 are perpendicular to each other, so that the stray light is hardly incident on the imaging position P. That is, the imaging device is not substantially affected by the stray light. The rays are not strongly separated from the optical axes $\phi1$ and $\phi2$, so that the loss of the amount of light can be reduced.

In the second embodiment shown in FIGS. 5A and 5B, the first and the second focusing elements 1 and 2 have the same focusing characteristic so as to be optically equivalent.

In the above embodiments shown in FIGS. 3A, 3B, 5A and 5B, the roof mirror 6 is inclined with respect to the first and second focusing elements 1 and 2 at an angle of 45°. However, the angle can be set another value. If the size of each of the first and second focusing elements 1 and 2 is not limited, the roof mirror 6 can be inclined with respect to the focusing elements 1 and 2 at an angle less than 45°. In addition, in consideration of the layout of the CCD (a photosensitive body in a optical writing system) on which the imaging point P is formed, the angle can be set at a value greater than 45°.

Figure 6A:
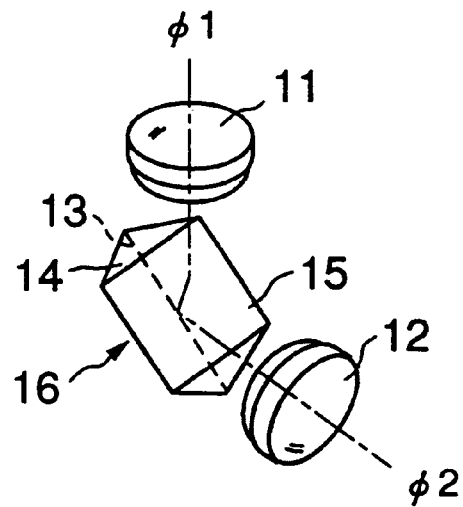
FIG. 6A is a diagram illustrating a structure of the imaging device according to a third embodiment of the present invention.

The imaging device according to the third embodiment is formed as shown in FIG. 6A. Referring to FIG. 6A, the imaging device has a first focusing element 11, a second focusing element 12 and a roof prism 16. The roof prism 16 has a surface 14 and a surface 15 which are connected to each other at an angle of 90° so that a ridge line 13 is formed.

This type of the imaging device may be also used in the reading optical system of the facsimile machine. The first focusing element 11 and the second focusing element 12 have the same focusing characteristic so as to be optically equivalent. The first and second focusing elements 11 and 12 are arranged so that the optical axes φ1 and φ2 of the focusing elements 11 and 12 are perpendicular to each other. The roof prism 16 is arranged so that the ridge line 13 is on a plane including the optical axes φ1 and φ2, intersects the optical axes φ1 and φ2 and is inclined at a predetermined angle with respect to the optical axes φ1 and φ2.

The rays which are made be in parallel by the first focusing element 11 are reflected by the surfaces 14 and 15 of the roof prism 16 twice, and is then incident on the second focusing element 12. The rays which are in parallel are focused on an imaging position by the second focusing element 12.

Thus, the imaging device in this embodiment (the third embodiment) can obtain the same advantages as that in the first embodiment as described above.

In a case where the roof prism 16 is made of normal glass, the refractive index is about 1.54 (n=1.54) in a visible region. If the rays are incident on the roof prism 16 under a critical condition (an incident angle θ=1/n; 40.5° in this case), the rays are in a total reflection state in the roof prism 16. In this case, the amount of light can be more effectively used than in the conventional case using mirrors on which aluminum films are formed by evaporation.

Figure 6B:
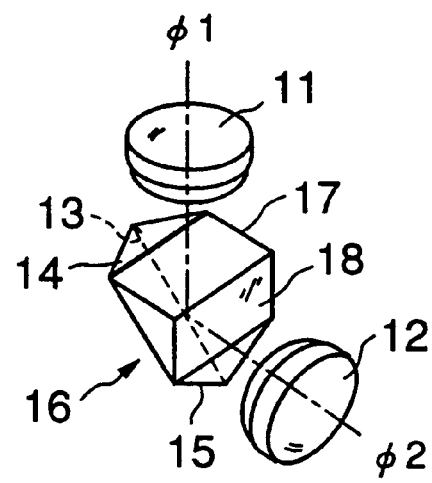
FIG. 6B is a diagram illustrating a modification of the imaging device shown in FIG. 6A.

FIG. 6B shows a modification of the imaging device show in FIG. 6A. The roof prism 16 has further surfaces 17 and 18. A normal line of the surface 17 is parallel to the optical axis φ1 of the first focusing element φ1. A normal line of the surface 18 is parallel to the optical axis φ2 of the second focusing element 12. The rays from the reading position is incident on the surface 17 and the rays emitted through the surface 18 travels toward the imaging position.

Figure 6C:
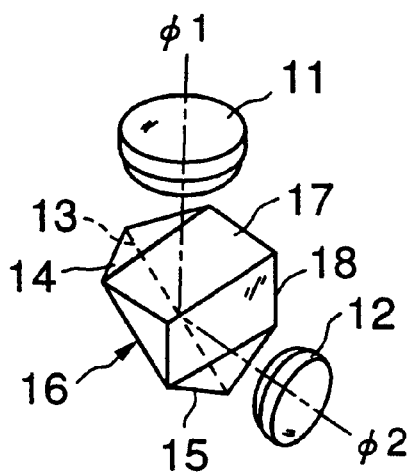
FIG. 6C is a diagram illustrating a modification of the imaging device shown in FIG. 6B.

FIG. 6C shows a modification of the imaging device shown in FIG. 6B. In this modification, the focusing characteristic of the first focusing element 11 differs from that of the second focusing element 12. For example, the focusing power of the second focusing element 12 is increased so that the focal length of the second focusing element 12 is shortened. As a result, the CCD sensor or the photosensitive body on which the imaging position is formed can be close to the imaging device. Thus, the optical reading system or the optical writing system using this type of the imaging device can be miniaturized.

Figure 7:
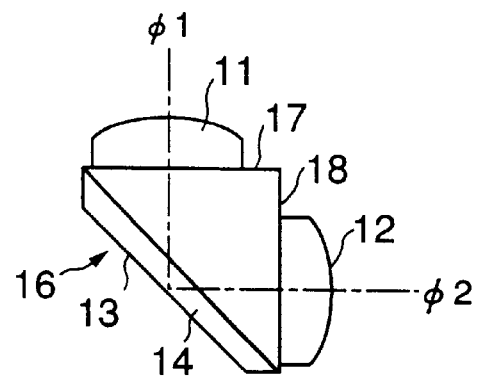
FIG. 7 is a diagram illustrating a structure of the imaging device according to a fourth embodiment of the present invention.

The imaging device according to the forth embodiment of the present invention is formed as shown in FIG. 7. In FIG. 7, those parts which have the same functions as those shown in FIGS. 3A through 6C are given the same reference numbers.

Referring to FIG. 7, the roof prism 16 having the surfaces 17 and 18 is used. The first and second focusing elements 11 and 12 are integrated with the roof prism 16. The first and second focusing element 11 and 12 and the roof prism 16 simultaneously may be made of glass so that the first and second focusing elements 11 and 12 are respectively formed on the surfaces 17 and 18. The first and second focusing element 11 and 12 may be also respectively adhered to the surfaces 17 and 18.

According to this type of the imaging device, the number of boundary surfaces is reduced, the amount of reflection loss of the rays which are reflected by the boundary surfaces can be reduces.

Figure 8:
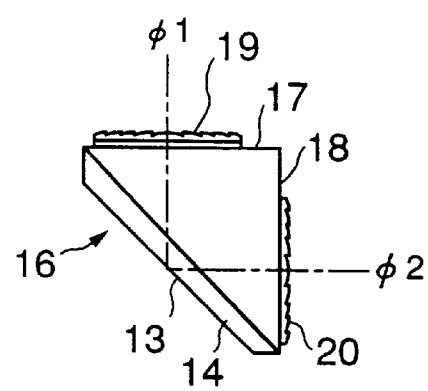
FIG. 8 is a diagram illustrating a structure of the imaging device according to a fifth embodiment of the present invention.

The imaging device according to the fifth embodiment of the present invention is formed as shown in FIG. 8. In FIG. 8, those parts which have the same functions as those shown in FIGS. 3A through 7 are given the same reference numbers.

Referring to FIG. 8, Fresnel lenses 19 and 20 are integrated with the roof prism 16. The Fresnel lenses 19 and 20 and the roof prism 16 may be made of glass so that the Fresnel lenses 19 and 20 are respectively formed on the surfaces 17 and 18. The Fresnel lenses 19 and 20 which are shaped in plate may be also respectively adhered to the surface 17 and 18.

Figure 9:
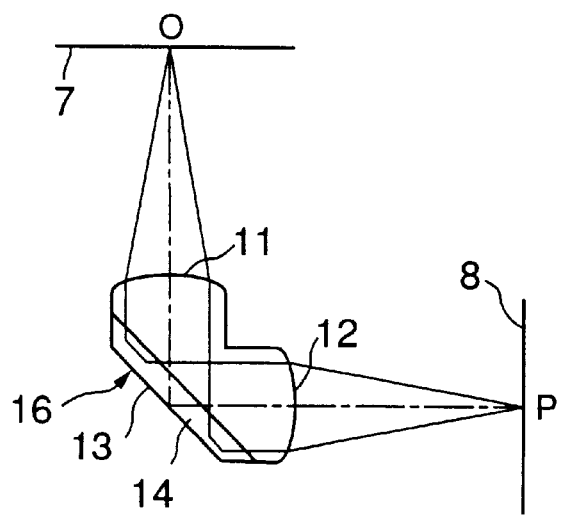
FIG. 9 is a diagram illustrating a structure of the imaging device according to a sixth embodiment of the present invention.

The imaging device according to the sixth embodiment of the present invention is formed as shown in FIG. 9. In FIG. 9, those parts which have the same functions as those shown in FIGS. 3A through 8 are given the same reference numbers.

Referring to FIG. 9, the roof prism 16 are made so that the surfaces 11 and 12 having the functions of the first and the second focusing elements 11 and 12 are formed in a single solid body.

Figure 10A:
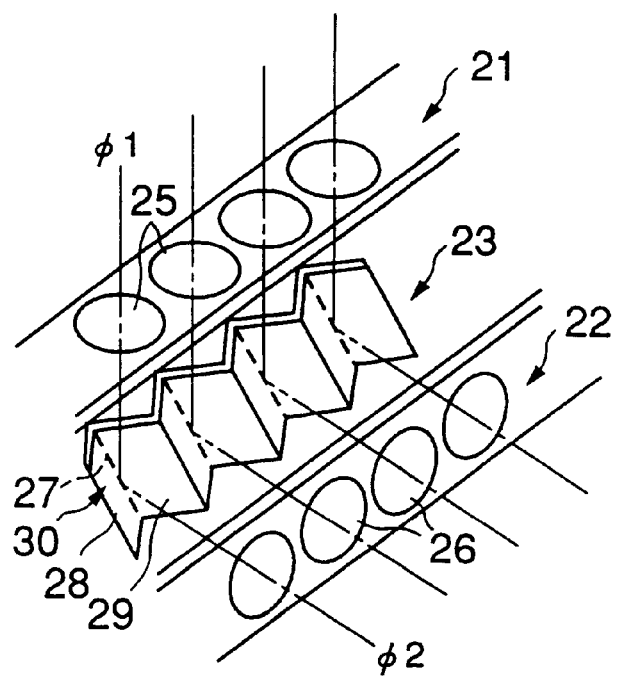
FIGS. 10A, 10B and 10C are diagrams illustrating a structure of the imaging device according to a seventh embodiment of the present invention.
Figure 10B:
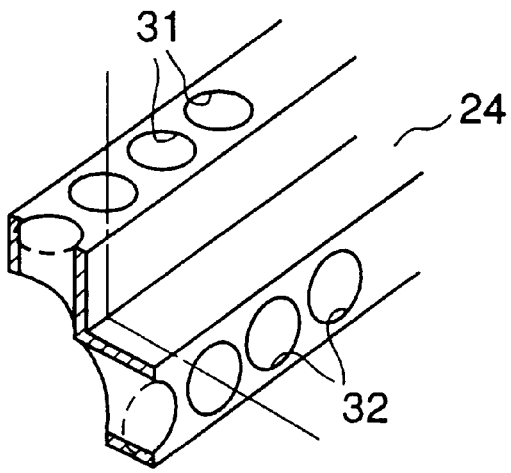
Figure 10C:
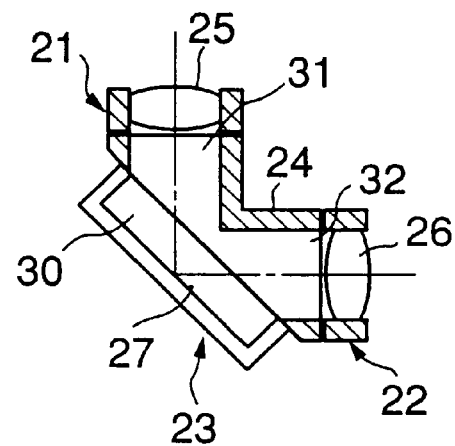

The imaging device according to the seventh embodiment of the present invention is formed as shown in FIGS. 10A, 10B and 10C. This type of the imaging device may be used as the equimagnification imaging device in the reading system of a facsimile machine.

Referring to FIG. 10A, the imaging device has a first focusing element array 21, a second focusing element array 22, a roof mirror array 23 and an aperture block 24. The rays from a reading surface are incident on the first focusing element array 21. The rays emitted from the second focusing element array 22 travels towards the imaging surface. The roof mirror array 23 is located between the first focusing element array 21 and the second focusing element array 22. The aperture block 24 is located among the first focusing element array 21, the second focusing element array 22 and the roof mirror array 23. The aperture block 24 formed as shown in FIG. 10B is used as a stop member.

The first focusing element array 21 is formed of focusing elements 25 which are optically equivalent and arranged in line at constant intervals. The second focusing element array 22 is, in the same manner as the first focusing element array 21, formed of focusing elements 26 which are optically equivalent and arranged in line at the constant intervals. The roof mirror array 23 is formed of roof mirrors 30. Each of the roof mirrors 30 corresponds to a pair of one of the focusing elements 25 of the first focusing element array 21 and one of the focusing elements 26 of the second focusing element array 22. Each of the roof mirrors 30 is formed of surfaces 28 and 29 which are connected to each other at an angle of 90° so that a ridge line 27 is formed. The ridge line 27 of each of the roof mirrors 30 is located at a position at which an optical axis of a corresponding one of the focusing elements 25 and an optical axis of a corresponding one of the focusing elements 26 intersect each other. The roof mirror array 23 is inclined at an angle of 45° with respect to the first and second focusing element arrays 21 and 22. That is, the relationship among each of the roof mirrors 30, a corresponding one of the focusing elements 25 and a corresponding one of the focusing elements 26 is identical to that of the first and second focusing elements 1 and 2 and the roof mirror 6. The aperture block 24 prevents the cross talk between adjacent focusing elements 25 and between adjacent focusing elements 26 so that the resolution and the amount of light traveling the focusing elements 25 and 26 are optimized. In the aperture block 30, pairs of aperture 31 and 32 are arranged in line at the same intervals as the focusing elements 25 and 26 of the first and second focusing element array 21 and 22.

In the imaging device having the structure as described above, the optical axis of each of the focusing elements 25 is on a plane which includes the ridge line 27 of a corresponding one of the roof mirrors 30 and is perpendicular to a direction in which the focusing elements 25 are arranged. The light from a surface of an original is made be parallel light by the focusing elements 25. The parallel light is then incident on the roof mirrors 30. The plane light incident on the roof mirrors 30 is reflected by the surfaces 28 and 29 twice in each of the roof mirrors 30. The light incident into each of the roof mirrors 30 is reflected at an angle of 90° and travels to a corresponding one of the focusing elements 26 of the focusing element array 22 as shown in FIG. 10C. The light is focused on the imaging surface by each of the focusing elements 26. Each of the focusing elements 26 has the same focusing functions as each of the focusing elements 25 so that the focusing elements 25 and 26 are optically equivalent. As a result, the imaging surface corresponding to the reading surface can be formed at the optimum position. The light is reflected by each of the roof mirrors 30 twice, an erect image having the same size of an object on the original (the equimagnification) is formed. In this case, effective reading widths of adjacent focusing elements 25 and 26 overlap each other so that a required effective reading width is obtained. Thus, the focal length of each of the focusing elements 25 and 26 can be reduced, so that the imaging device can be miniaturized.

The degree of freedom of layout of the imaging position can be improved in comparison with the conventional case shown in FIG. 1. The light travels along the optical axis $\phi 1$ and $\phi 2$, so that the utilization of the amount of the light can be improved. The separation mirrors 109(1) and 109(2) which are used in the conventional type of the imaging device can be omitted. Although the second focusing element array 22 is needed, the first focusing element array 21 which is optically equivalent to the second focusing element array 22 can be used as the second focusing element array 22. Thus, the kinds of optical parts of the imaging device is not increased. In an actual case, the first and second focusing element arrays 21 and 22, the roof mirror array 23 and the aperture block 24 can be molded into a single solid body. The direction in which the light travels to the roof mirror array 23 is perpendicular to the direction in which the light travels from the roof mirror array 23 toward the imaging surface. Thus, the stray light can be prevented from being incident on the imaging surface. As a result, the stray light does not affect the imaging characteristics, so that the contrast and the resolution of images formed on the imaging surface can be improved.

Figure 11A:
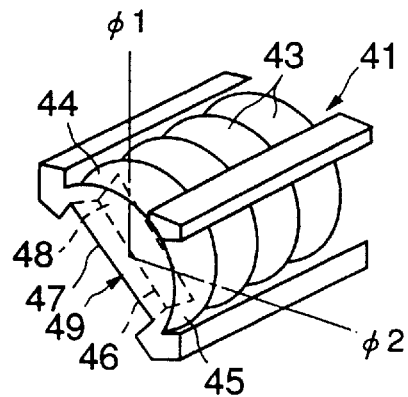
FIGS. 11A, 11B, 11C and 11D are diagrams illustrating a structure the imaging device according to a eighth embodiment of the present invention.

The imaging device according to the eighth embodiment of the present invention is formed as shown in FIG. 11A. This type of imaging device may be used as the equimagnification imaging device.

Figure 11B:
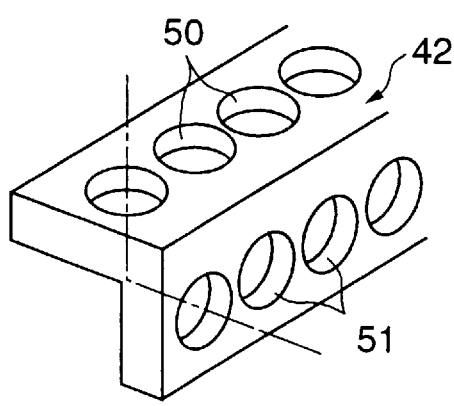

Referring to FIG. 11A, the imaging device has a roof prism lens array 41 and a aperture block 42. The roof prism lens array 41 is formed of roof prism lenses 43 are arranged in line. Each of the roof mirror prism lenses 43 is a minimum unit of an imaging system. Each of the roof prism lenses 43 is formed of an incident-side focusing element 44, an imaging-side focusing element 45 and a roof prism portion 49. The roof prism portion 49 has surfaces 47 and 48 which are connected to each other at an angle of 90° so that a ridge line 46 is formed. The incident-side focusing element 44 and the imaging-side focusing element 45 are optically equivalent to each other. The roof prism portion 49 is located at a position at which the axis $\phi 1$ of the incident-side focusing element 44 and the axis $\phi 2$ of the imaging-side focusing element 45 intersect each other at an angle of 90°. The ridge line 46 is inclined at an angle of 45° with respect to the axes $\phi 1$ and $\phi 2$. Thus, a direction in which the roof prism lenses 43 of the roof prism lens array 41 are arranged is perpendicular to the ridge line 46 of each of the roof prism lenses 43. The aperture block 42 has apertures 50 and 51, as shown in FIG. 11B, which are respectively arranged in line at the same intervals as the focusing elements 44 and 45.

Figure 11C:
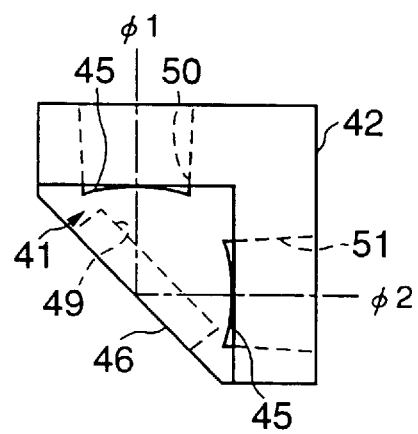

In the imaging device having the structure as described above, the optical axis $\phi 1$ of each of the incident-side focusing elements 44 is on a plane which includes the ridge line 46 of the roof prism portion 49 and perpendicular to the direction in which the roof prism lenses 43 are arranged, as shown in FIG. 11C. The incident-side focusing element 44 makes the rays from the original be in parallel, and the rays are then incident on the roof prism portion 49. The rays are reflected in the roof prism portion 49 twice so that the direction in which the rays travel is changed by an angle of 90°. The rays are then emitted from the imaging-side focusing element 45. Images are formed on the imaging surface by the imaging-side focusing element 45. Since the imaging-side focusing element 45 is optically equivalent to the incident-side focusing element 44, the relationship between the reading surface and the incident-side focusing element 44 and the relationship between the imaging surface and the imaging-side focusing element 45 are identical to each other. The rays are reflected in the roof prism portion 49 twice, so that an erect image having the same size of an object on the original (the equimagnification) is formed. In this case, effective reading widths of adjacent focusing elements 44 and 45 overlap each other so that a required effective reading width is obtained. Thus, the focal length of each of the focusing elements 44 and 45 can be reduced, so that the imaging device can be miniaturized.

Figure 11D:
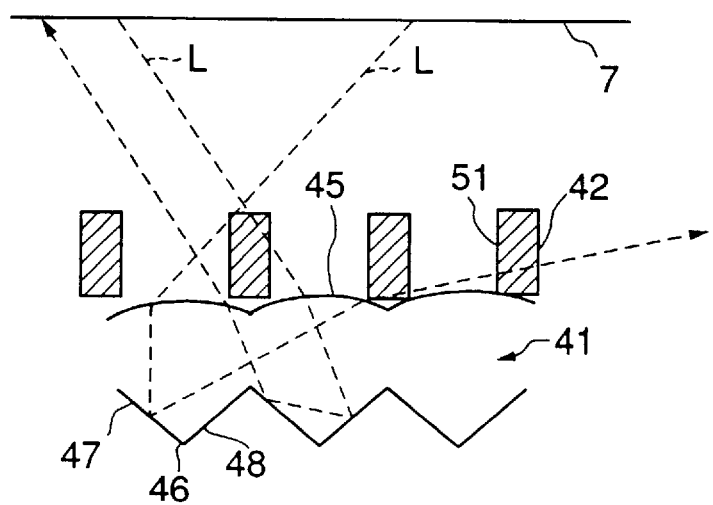

As shown in FIG. 11D, the aperture block 42 prevents the stray light from affecting the rays for images. Although the real device has three dimensions, FIG. 11D illustrates a two dimensional model of the imaging device to simplify.

According to the above embodiment, the degree of freedom of the layout of the imaging position can be improved in comparison with the conventional case (see Japanese Patent Publication No.61-2929). The rays travel used for imaging travel along the optical axis $\phi 1$ and $\phi 2$, so that the utilization of the amount of the light can be improved. The separation mirrors 109(1) and 109(2) which are used in the conventional type of the imaging device can be omitted. The axis $\phi 1$ of the incident-side focusing element 44 is perpendicular to the axis $\phi 2$ of the imaging-side focusing element 45. Thus, the stray light can be prevented from being incident on the imaging surface. As a result, the stray light does not affect the imaging characteristics, so that the contrast and the resolution of images formed on the imaging surface can be improved.

Figure 12:
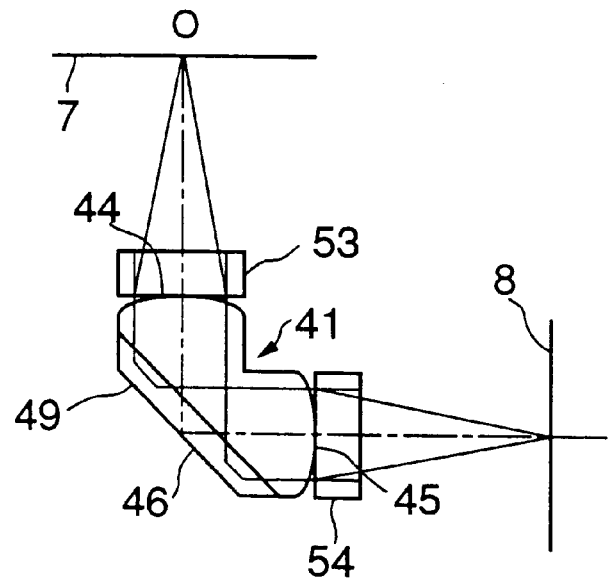
FIG. 12 is a diagram illustrating a structure of the imaging device according to a ninth embodiment of the present invention.

The imaging device according to the ninth embodiment of the present invention is formed as shown in FIG. 12. In FIG. 12, those parts which have the same function as those shown in FIGS. 3A through FIG. 11D are given the same reference numbers. In this embodiment, aperture members 53 and 54 are respectively mounted on the incident-side focusing element 44 and the imaging-side focusing element 45 of each of the roof prism lenses 43.

Figure 13:
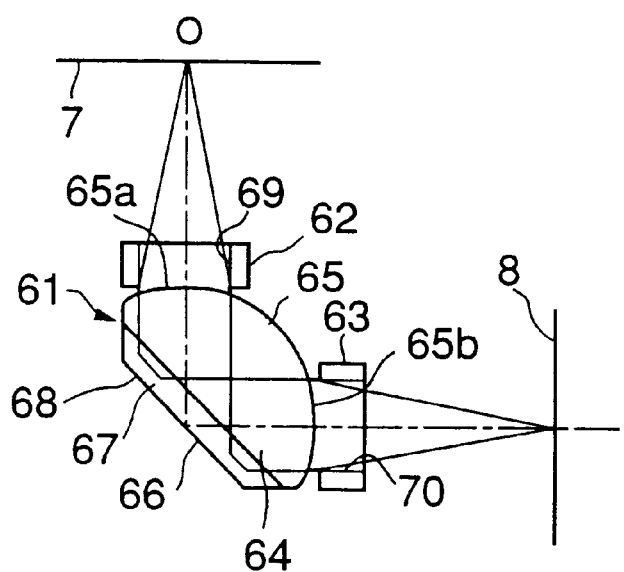
FIG. 13 is a diagram illustrating a structure of the imaging device according to a tenth embodiment of the present invention.

The imaging device according to the tenth embodiment of the present invention is formed as shown in FIG. 13. This type of imaging device is used as the equimagnification imaging device.

Referring to FIG. 13, the imaging device has a roof prism lens array 61 and aperture members 62 and 63 which are assembled. The roof prism lens array 61 is formed roof prism lenses 64 which are arranged in line. Each of the roof prism lenses 64 is a minimum unit of the imaging system. Each of the roof prism lenses 64 has a focusing element portion 65 and a roof prism portion 68 which are integrated with each other. The roof prism portion 68 has surfaces 67 (one of the surface 67 is shown in FIG. 13) which are connected to each other at an angle of 90° so that a ridge line 66 is formed. The focusing element portion 65 has an incident-side focusing portion 65a and an imaging-side focusing portion 65b. The incident-side focusing portion 65a and the imaging-side focusing portion 65b have an optically equivalent focusing function. The optical axis $\phi 1$ of the incident-side focusing portion 65a is perpendicular to the optical axis $\phi 2$ of the imaging-side focusing portion 65b. The ridge line 66 is on a plane including the optical axes $\phi 1$ and $\phi 2$, intersects the optical axes $\phi 1$ and $\phi 2$, and is inclined at an angle of 45° with respect to the optical axes $\phi 1$ and $\phi 2$. The direction in which the roof prism lenses 64 are arranged is perpendicular to the ridge line 66 of each of the roof prism lenses 64. In the respective aperture members 62 and 63, apertures 69 and 70 are arranged in a line at the same intervals as the roof prism lenses 64.

In the imaging device having the above structure, the optical axis of the incident-side focusing portion 65a is on a plane which includes the ridge line 66 of the roof prism portion 68 and is perpendicular to the direction in which the roof prism lenses 64 are arranged. The incident-side focusing portion 65a makes the rays from the original be in parallel, and the rays are then incident on the roof prism portion 68. The rays are reflected by the surfaces 67 in the roof prism portion 68 twice so that the direction in which the rays travel is changed by an angle of 90°. The rays are then emitted from the imaging-side focusing portion 65b. The rays are focused on the imaging surface by the imaging-side focusing portion 65b so that images are formed on the imaging surface.

Since the imaging-side focusing portion 65b is optically equivalent to the incident-side focusing portion 65a, the relationship between the reading surface and the incident-side focusing portion 65a and the relationship between the imaging surface and the imaging-side focusing portion 65b are identical to each other. The rays are reflected in the roof prism portion 68 twice, so that an erect image having the same size of an object on the original (the equimagnification) is formed. In this case, effective reading widths of adjacent focusing element portions 65 (each of which is formed of the focusing portions 65a and 65b) overlap each other so that a required effective reading width is obtained. Thus, the focal length of each of the focusing portions 65a and 65b can be reduced, so that the imaging device can be miniaturized.

A single focusing element portion 65 includes the incident-side focusing portion 65a and the imaging-side focusing portion 65b. The focusing element portion can be easily made in comparison with a case where two focusing elements are separately made.

Figure 14A:
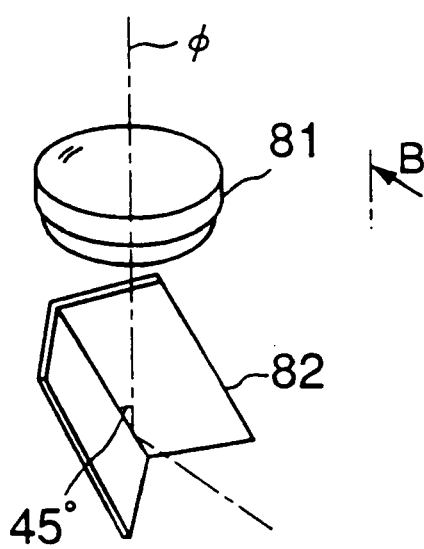
FIGS. 14A, 14B, 14C and 14D are diagrams illustrating an eleventh embodiment of the present invention.
Figure 14B:
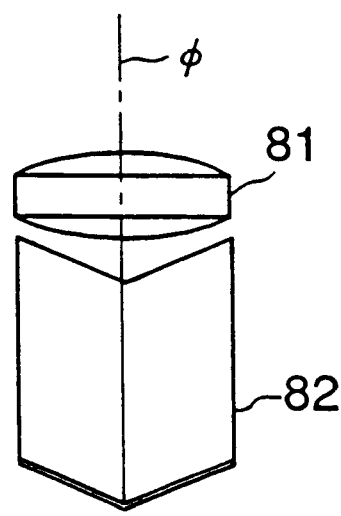
Figure 14C:
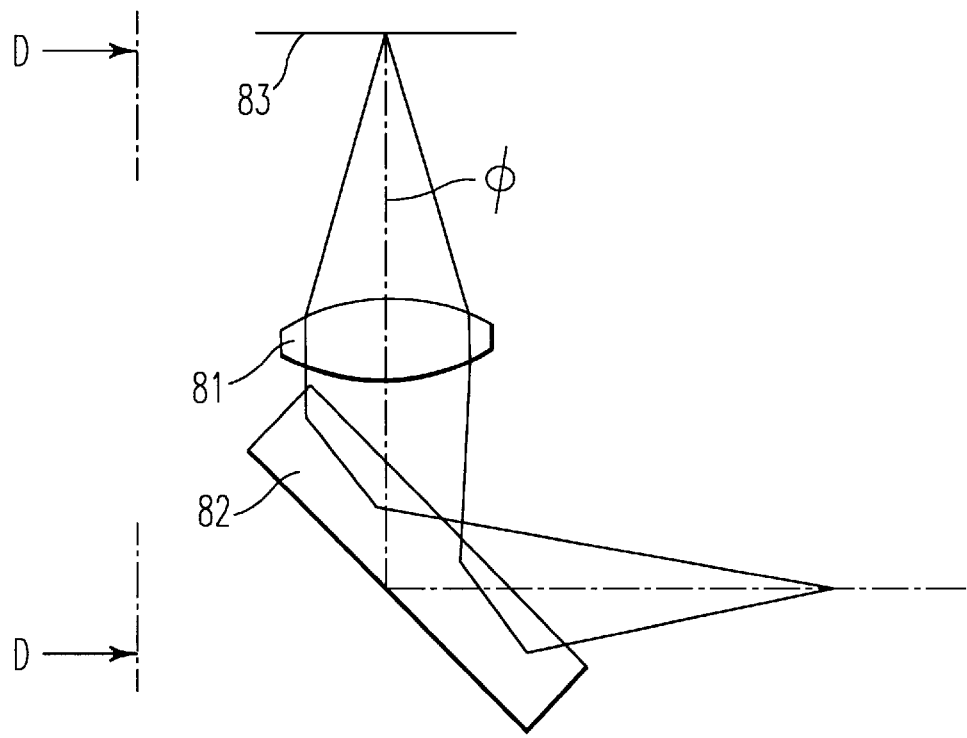
Figure 14D:
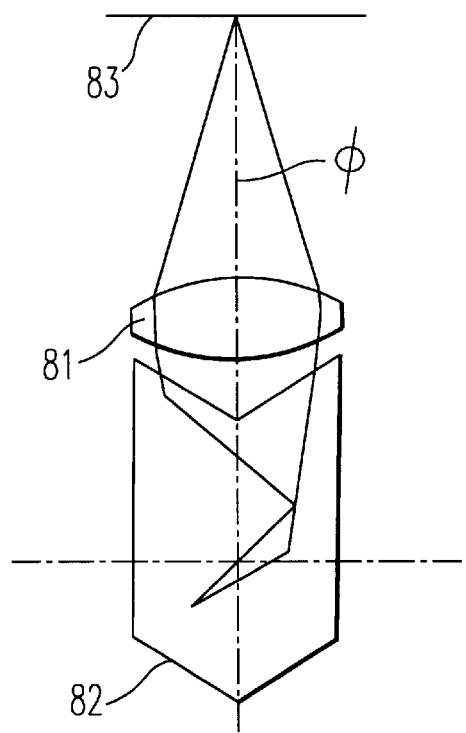

The image device according to the eleventh embodiment of the present invention is formed as shown in FIG. 14A through FIG. 14D. FIG. 14A is a perspective view, FIG. 14B is a view in a direction B shown in FIG. 14a, FIG. 14C is a diagram illustrating focused rays, and FIG. 14D is a view in a direction D shown in FIG. 14C.

This type of imaging device has a focusing element 81 and a roof mirror 82. The roof mirror 82 is inclined at an angle of 45° with respect to the optical axis $\phi$ of the focusing element 81. The roof mirror 82 has a function for separating optical paths. An erect image is formed on a plane facing in a direction perpendicular to the ridge line of the roof mirror 82. A line sensor is located on the plane.

The roof mirror 82 may be inclined at an angle other than 45°. Based on the layout of the imaging device in optical equipment, the inclining angle of the roof mirror 82 is decided. If the size of the focusing element 81 is not limited, the inclining angle of the roof mirror 82 may be less than 45°.

Solid lines shown in FIGS. 14C and 14D correspond to rays travels in a diagonal direction with respect to the ridge line of the roof mirror 82. The design of the lens may be performed in accordance with the known ray tracing simulation method.

Figure 15:
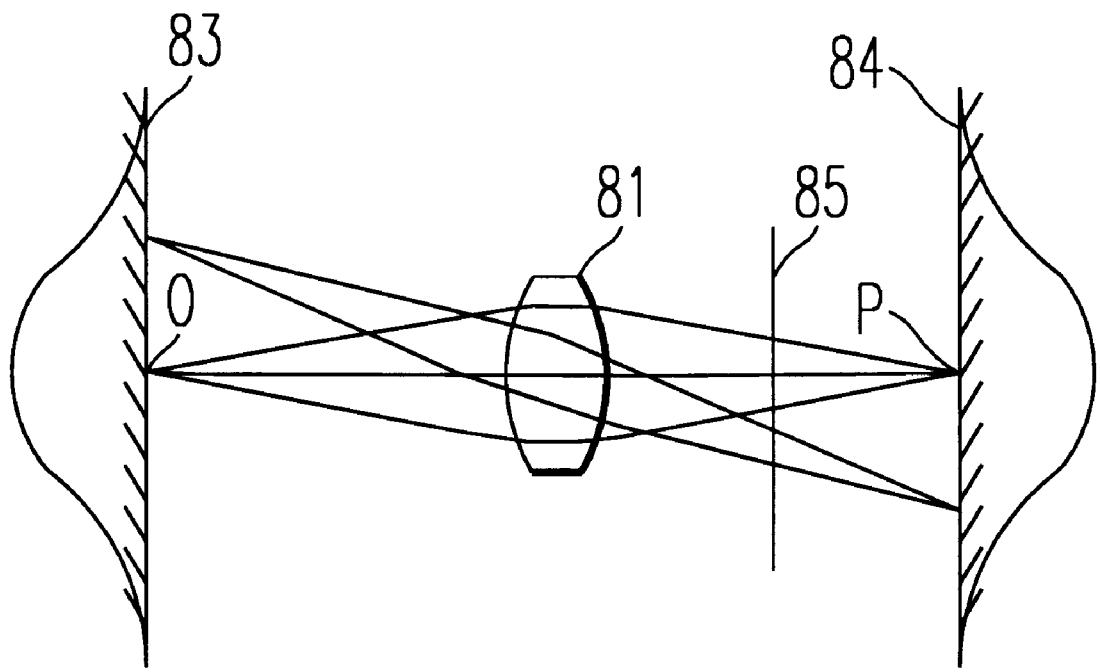
FIG. 15 is a diagram illustrating optical paths in an optical system equivalent to the imaging device shown in FIGS. 14A through 14D.

FIG. 15 illustrates optical paths in an optical system which is optically equivalent to the imaging device shown in FIGS. 14A, 14B, 14C and 14D. In FIG. 15, those parts which are the same as those shown in FIGS. 14A through 14D are given the same reference numbers.

Rays from corresponding to information on an original 83 is reflected twice by the roof mirror located on an imaginary surface 85. The imaginary surface 85 includes the ridge line of the roof mirror. The rays are then condensed on the focusing element 81. The focusing element 81 focuses the rays so that an image is formed at an imaging position P.

In a conventional case, a mirror is placed on the imaginary surface 85, so that the rays are reflected by the mirror in a direction perpendicular to a plane of FIG. 15. An inverted image is formed on an imaging surface facing the plane of FIG. 15.

Figure 16:
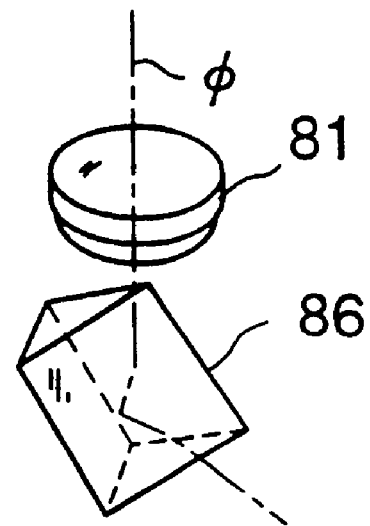
FIG. 16 is a diagram illustrating a structure of the imaging device according to a twelfth embodiment of the present invention.

The imaging device according to the twelfth embodiment of the present invention is formed as shown in FIG. 16. In FIG. 16, those parts which are the same as those shown in FIGS. 14A through 15 are given the same reference numbers.

Referring to FIG. 16, the imaging device has the focusing element 81 and a roof prism 86. The rays condensed by the focusing element 81 are incident on the roof prism 86. The rays are then reflected twice by surfaces perpendicular to each other in the rectangular prism 86. The rays emitted from the roof prism 86 are focused so that an image is formed on an imaging position.

In a case where the roof prism 86 is made of general glass, the refractive index n for the visible region is about 1.54 (n=1.54). If the rays are incident on the roof prism 8 under a critical condition (an incident angle $\theta=1/n$; 40.5° in this case), the rays are in a total reflection state in the rectangular prism 86.

Figure 17:
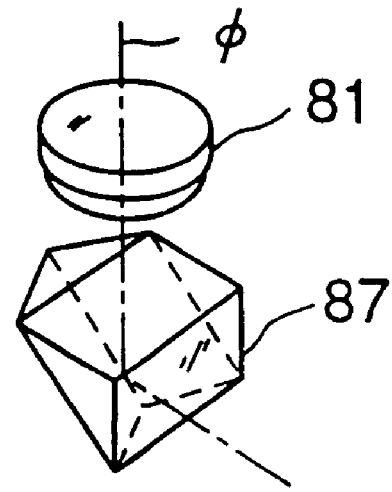
FIG. 17 is a diagram illustrating a structure of the imaging device according to a thirteenth embodiment of the present invention.

The imaging device according to the thirteenth embodiment of the present invention is formed as shown in FIG. 17. In FIG. 17, those parts which are the same as those shown in FIGS. 14A through 16 are given the same reference numbers.

Referring to FIG. 17, the imaging device has the focusing element 81 and a prism 87. The prism 87 has a surface on which the rays condensed by the focusing element 81 are incident. The normal line of the surface is parallel to the optical axis $\phi$ of the focusing element 81. The roof prism 87 has a surface through which the rays incident on the roof prism 87 is emitted.

Figure 18:
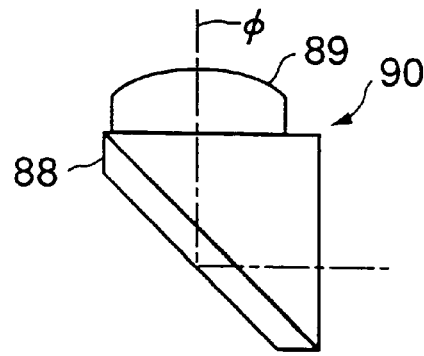
FIG. 18 is a diagram illustrating a structure of the imaging device according to a fourteenth embodiment of the present invention.

The imaging device according to the fourteenth embodiment of the present invention is formed as shown in FIG. 18.

Referring to FIG. 18, an imaging device 90 has a roof prism 88 and a focusing element 89. The roof prism 88 and the focusing element 89 are integrated with each other. In this type of imaging device, there is no boundary surface between a lens surface and air. Thus, a reflection loss of the rays traveling in the imaging device can be reduced.

Figure 19:
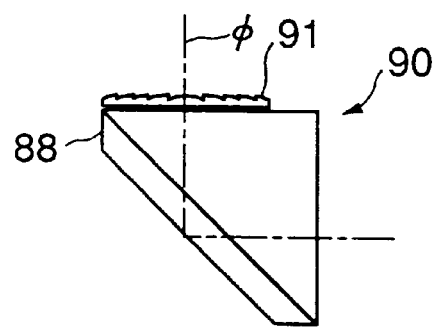
FIG. 19 is a diagram illustrating a structure of the imaging device according to a fifteenth embodiment of the present invention.

The imaging device according to the fifteenth embodiment of the present invention is formed as shown in FIG. 19. In FIG. 19, those parts which are the same as those shown in FIG. 18 are given the same reference numbers.

Referring to FIG. 19, the imaging device 90 has the roof prism 88 and a Fresnel lens 91. The roof prism 88 and the Fresnel lens 91 are integrated with each other using a lens cell. The Fresnel lens 91 may be adhered to the prism by a conventional method. The Fresnel lens 91 or a hologram lens which is plane shaped may be set on the roof prism. The Fresnel lens 91 may be directly formed on the prism by a 2P molding process using 2P resin or an injection molding process.

Figure 20:
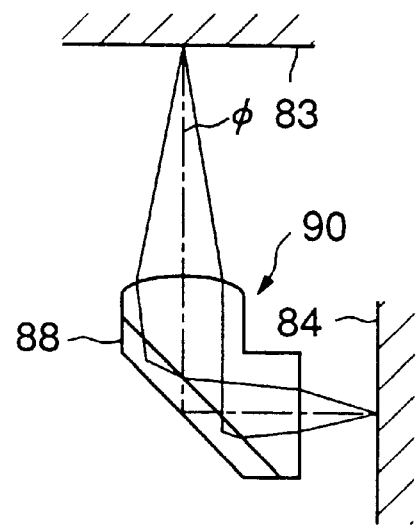
FIG. 20 is a diagram illustrating a structure of the imaging device according to a sixteenth embodiment of the present invention.

The imaging device according to the sixteenth embodiment of the present invention is formed as shown in FIG. 20. In FIG. 20, those parts which are the same as those shown in FIGS. 14 through 18 are given the same reference numbers.

In this type of the imaging device, the roof prism 88 and a focusing element which differs from those show in FIGS. 18 and 19 are integrated with each other.

Figure 21A:
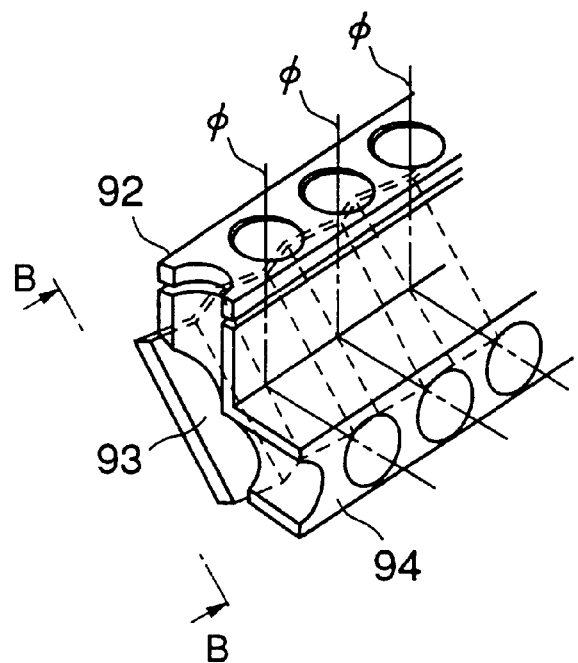
FIGS. 21A and 21B are diagrams illustrating a structure of the imaging device according to a seventeenth embodiment of the present invention.
Figure 21B:
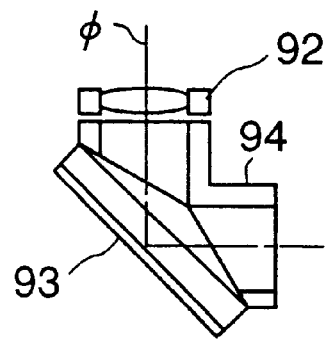

The imaging device according to the seventeenth embodiment of the present invention is formed as shown in FIGS. 21A and 21B. FIG. 21A is a perspective view and FIG. 21B is a view in a direction B shown in FIG. 21A.

Referring to FIGS. 21A and 21B, the imaging device has a lens array 92, a roof mirror array 93 and an aperture member 94. The lens array 92 has lenses arranged in line at constant intervals. The roof mirror array 93 has roof mirrors arranged in line at the same intervals as the lenses of the lens array 92. The aperture member 94 is put between the lens array 92 and the roof mirror array 93. The aperture member 94 has apertures having an area corresponding to the lenses of the lens array 92. The apertures are arranged in line at the same intervals as the lenses of the lens array 92.

The optical axis of a single lens is on a plane including a ridge line of a corresponding roof mirror and being perpendicular to a direction in which the lenses are arranged. Rays from an object are condense by the lens and reflected twice by the corresponding roof mirror. The direction in which the rays travel is changed by an angle which is twice as large as the inclining angle of the ridge line of the roof mirror. The rays are then focused on the imaging surface. The single lens makes an image having the same size as the object. Since the rays are reflected twice by the roof mirror, an erect image is formed.

Due to the aperture member 94 set between the lens array 92 (a focusing element array) and the roof mirror array 93, the resolution and the amount of light incident on the lenses are optimized. The aperture member 94 prevents the cross talk from occurring between adjacent lenses.

In a case of the imaging device as describe above, effective reading widths of adjacent lenses overlap each other so that a required effective reading with is obtained. If a single lens which has the effective reading width corresponding to the width of an A4 sized sheet is designed, the size of the single lens is large so that the focal length is large. However, in the imaging device as described above, the focal length of each of the lenses can be small, so that the miniaturized imaging device can be obtained.

Figure 22A:
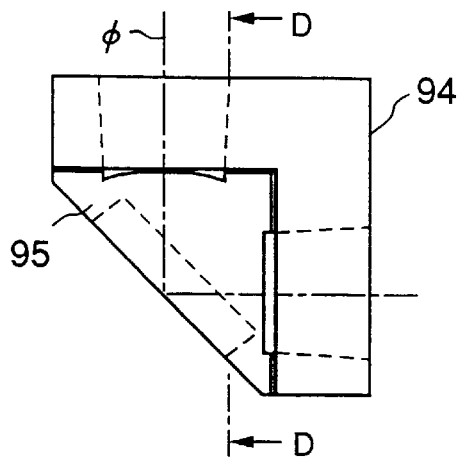
FIGS. 22A, 22B, 22C and 22D are diagrams illustrating a structure of the imaging device according to a eighteenth embodiment of the present invention.
Figure 22B:
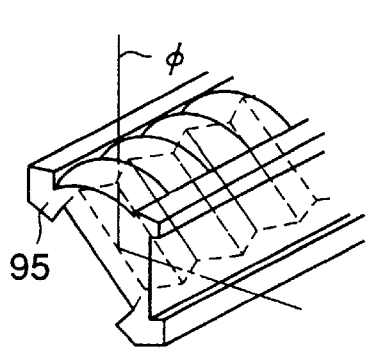
Figure 22C:
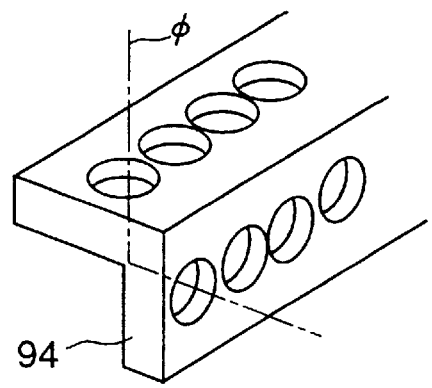
Figure 22D:
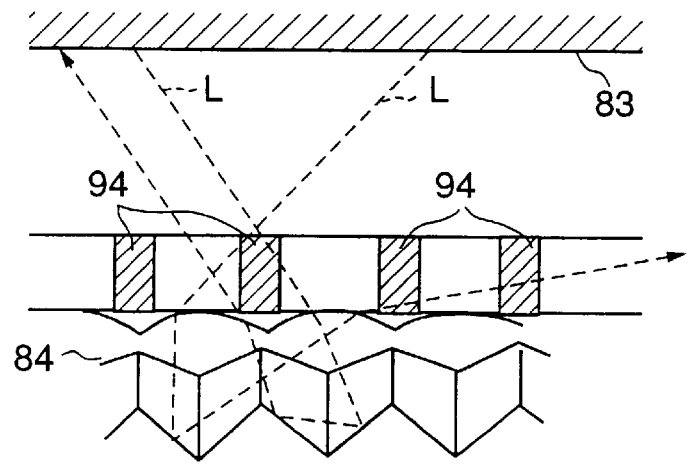

The imaging device according to the eighteenth embodiment of the present invention is formed as shown in FIGS. 22A through 22D. FIG. 22A is a side view, FIGS. 22B and 22C are perspective view of respective parts of the imaging device, and FIG. 22D is a view in a direction D shown in FIG. 22A.

This type of imaging device has a roof prism lens array 95 and the aperture member 94. The roof prism lens array 95 is formed of a focusing element array and a roof prism array which are integrated with each other. The aperture member 94 is located in front of the roof prism lens array 95. The aperture member 94 has apertures having an area corresponding to focusing elements of the focusing element array.

The optical axis of a single focusing element is on a plane including a ridge line of a corresponding roof prism and being perpendicular to a direction in which the focusing elements are arranged. Rays from an object are condense by the focusing element and reflected twice in the corresponding roof prism. The direction in which the rays travel is changed by an angle which is twice as large as the inclining angle of the ridge line of the roof prism. The rays are then focused on the imaging surface. The focusing element makes an image having the same size as the object. Since the rays are reflected twice by the roof mirror, an erect image is formed.

Due to the aperture member 94 set in front of the roof prism lens array 95, the resolution and the amount of light incident on the lenses are optimized. The aperture member 94 prevents the cross talk from occurring between adjacent focusing elements. As show in FIG. 22D, the aperture 94 prevents rays reflected by adjacent roof prisms from affecting images to be formed.

In a case of the imaging device as describe above, effective reading widths of adjacent roof prism lenses overlap each other so that a required effective reading with is obtained. If a single prism lens which has the effective reading width corresponding to the width (e.g, 220 mm) of an A4 sized sheet is designed, the size of the single lens is large so that the focal length is large. However, in the imaging device as described above, the focal length of each of the prism lenses arranged in line can be small, so that the miniaturized imaging device can be obtained.

Figure 23:
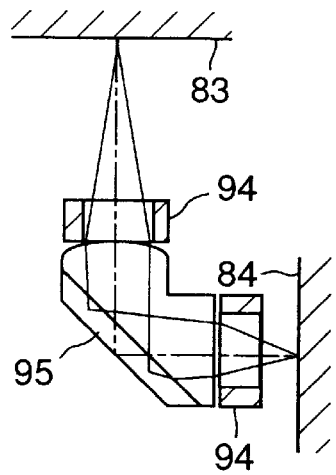
FIG. 23 is a diagram illustrating a structure of the imaging device according to a nineteenth embodiment of the present invention.

The imaging device according to the nineteenth embodiment of the present invention is formed as shown in FIG. 23. In FIG. 23, those parts which are the same as those shown in FIGS. 14A through 22D are given the same reference numbers.

In this type of the imaging device, the aperture member 94 is divided into two parts. One of the parts is set in front of a surface of the prism lens on which the rays from the object are incident. Another of parts is set in front of a surface of the prism lens from which the rays reflected in the prism lens are emitted.

A description will now be given of other embodiments of the present invention.

Figure 24:
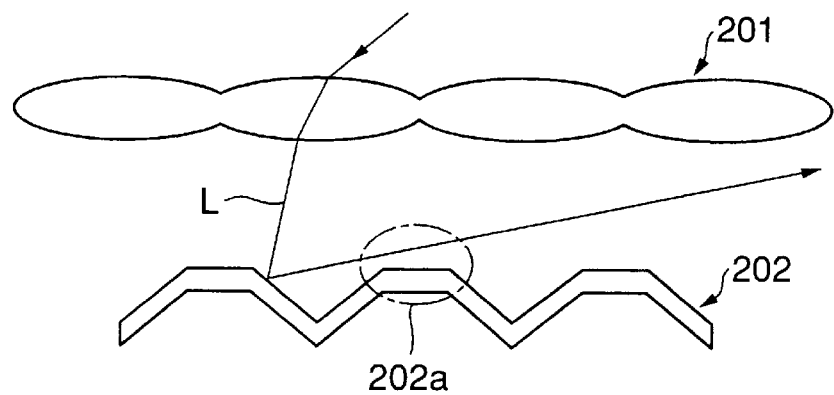
FIG. 24 is a diagram illustrating a structure of the imaging device according to a twentieth embodiment of the present invention.

Referring to FIG. 24, the imaging device has a lens array 201 and a roof mirror array 202. A regular reflection preventive structure is formed on some or all of ridge line portions 202a, between arranged optical axes, of the mirror array 202. The regular reflection preventive structure controls directions of stray light and a degree of scattering in the imaging device. A flat surface, a curved surface and a polygonal surface may be formed as the regular reflection preventive structure on the ridge line portions 202a, between arranged optical axes of the roof mirror array 202.

Figure 25:
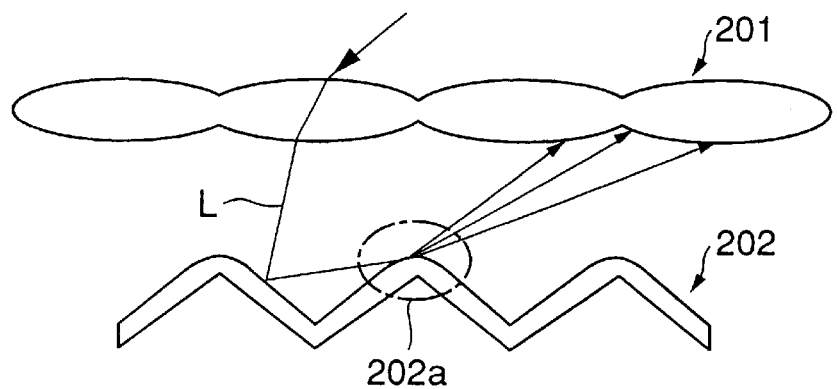
FIG. 25 is a diagram illustrating a structure of the imaging device according to a twenty-first embodiment of the present invention.

In the imaging device according to the twentieth embodiment as shown FIG. 24, a flat surface is formed as the regular reflection preventive structure on each of the ridge line portions 202a, between arranged optical axes, of the roof mirror array 202. In the imaging device according to the twenty-first embodiment of the present invention as shown in FIG. 25, a curved surface is formed as the regular reflection preventive structure on each of the ridge line portions 202a of the roof mirror array 202.

As shown in FIG. 24, the amount of stray light reflected at the ridge line portions 202a of the roof mirror array 202 can be decreased. In the case shown in FIG. 25, the degree of scattering of the stray light L can be controlled in accordance with the curving condition of the curved surface. In addition, in a case where a polygonal surface is formed as the regular reflection preventive structure on each of the ridge line portions 202a, between arranged optical axes, of the roof mirror array 202, the stray light can be divided into parts, and directions of the parts of the stray light and the amount of the parts of the stray light can be controlled.

The regular reflection preventive structure can decrease the amount of stray light, so that it is not necessary to close the lens array 201 and the roof mirror array 202 to each other. Thus, the degree of freedom of the optical design of the imaging device can be improved. Further, since only the stray light is controlled, the brightness of images is not affected by the regular reflection preventive structure. Thus, high quality images can be formed by the imaging device.

Figure 26:
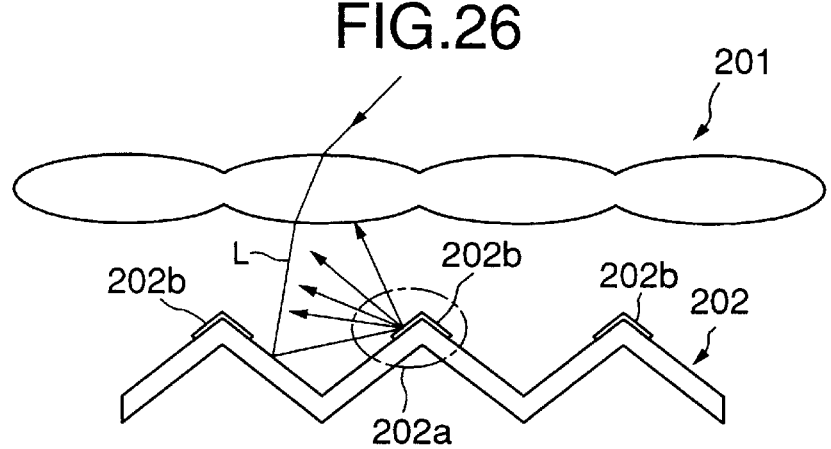
FIG. 26 is a diagram illustrating a structure of the imaging device according to a twenty-second embodiment of the present invention.

The imaging device according to the twenty-second embodiment is formed as shown in FIG. 26. In FIG. 26, those parts which are the same as those shown in FIGS. 24 and 25 are given the same reference numbers.

Referring to FIG. 26, a rough surface member 202b is mounted on each of the ridge line portion 202a, between arranged optical axes, of the roof mirror array 202. The stray light L incident on the each of the ridge line portion 202a is scattered by the rough surface member 202b. The amount of the stray light L is reduced, so that high quality images can be obtained.

Figure 27:
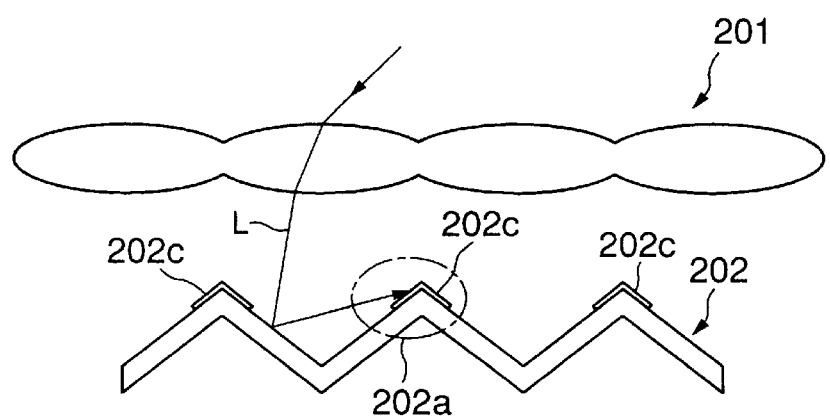
FIG. 27 is a diagram illustrating a structure of the imaging device according to a twenty-third embodiment of the present invention.

The imaging device according to the twenty-third embodiment of the present invention is formed as shown in FIG. 27. In FIG. 27, those parts which are the same as those shown in FIGS. 24, 25 and 26 are given as the same reference numbers.

Referring to FIG. 27, a light absorbing member 202c is mounted on each of the ridge line portion 202a, between arranged optical axes, of the roof mirror array 202. The stray light L incident on the each of the ridge line portion 202a is absorbed by the light absorbing member 202c. The stray light reflected by each of the ridge line portions 202a can be eliminated, so that high quality images (high contrast images) can be obtained.

Figure 28:
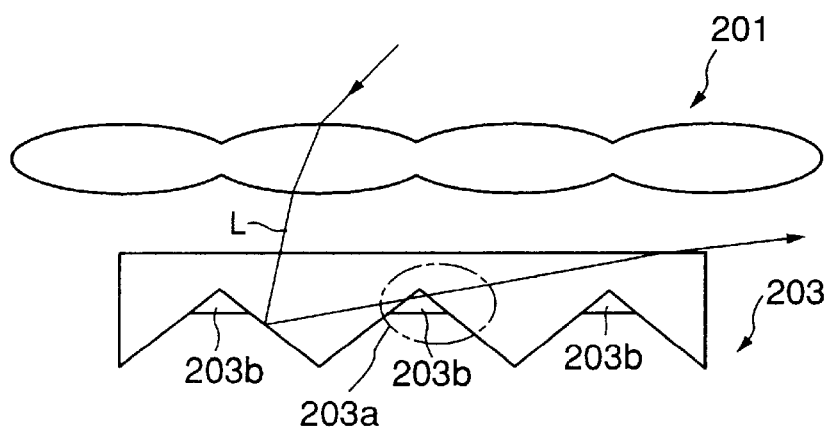
FIG. 28 is a diagram illustrating a structure of the imaging device according to a twenty-fourth embodiment of the present invention.

The imaging device according to the twenty-fourth embodiment of the present invention is formed as shown in FIG. 28. In FIG. 28, those parts which are the same as those shown in FIGS. 24, 25, 26 and 27 are given of the same reference numbers.

Referring to FIG. 28, the imaging device has the lens array 201 and a roof prism array 203. The roof prism array 203 has root portions 203a between arranged optical axes. At each of the root portions 203a, surfaces are connected to each other so that a V-shaped groove is formed. A transparent member 203b is provided in each of the root portions 203a of the roof prims array 203. The transparent has a refractive index close to that of the roof prism array 203. The light passes through the transparent member 203b, so that the amount of stray light reflected by surfaces of the root portions 203a is reduced.

Figure 29A:
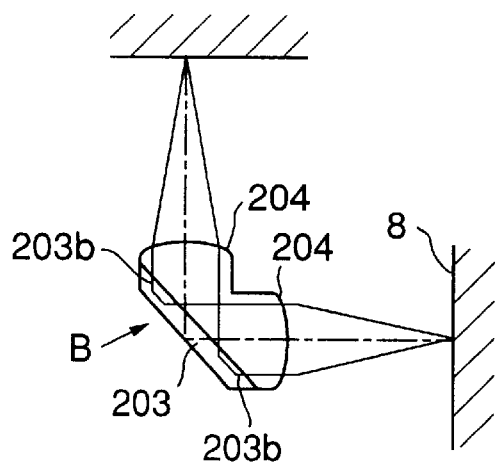
FIGS. 29A, 29B, 29C, 29D, 29E and 29F are diagrams illustrating structures of the imaging device according to other embodiments.

The imaging devices according to other embodiments are formed as shown in FIGS. 29A, 29B, 29C, 29D, 29E and 29F. In FIGS. 29A though 29F, those parts which are the same as those shown in FIGS. 24, 25, 26, 27 and 28 are given of the same reference numbers.

Referring to each of FIGS. 29A, 29B, 29C, 29D, 29E and 29F, the imaging device has the roof mirror prism array 203 and a focusing optical system which are integrated with each other.

In an embodiment shown in FIG. 29A, focusing elements 204 and 204 is connected, as the focusing optical system, to the roof prism 203. The transparent member 203b is applied to both ends of each of the root portions, between arranged optical axes, of the roof prism 203. The refractive index of the transparent member 203b is close to that of the roof prism array 203. The focusing element 204 on which rays from an object are incident makes the rays to be in parallel, and the rays are reflected by the roof prism 203. The rays are then focused by the focusing element 204 which faces the imaging surface so that an image corresponding to the object is formed on the imaging surface.

The amount of light reflected by the root portions of the roof mirror prism 203 can be reduced. As a result, the amount of stray light in the imaging device can be reduced.

Figure 29B:
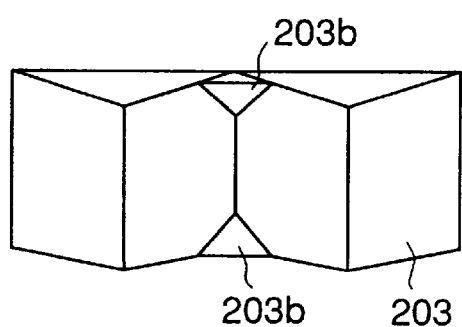
Figure 29C:
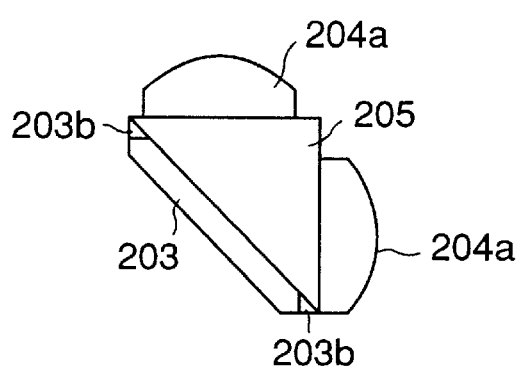
Figure 29D:
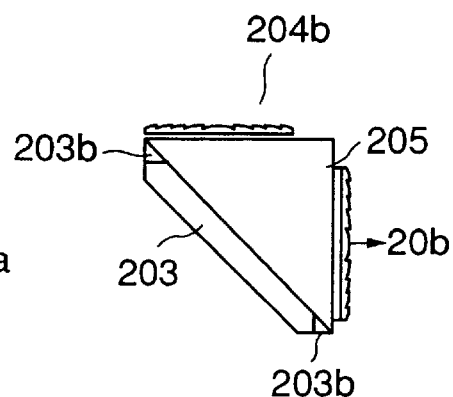
Figure 29E:
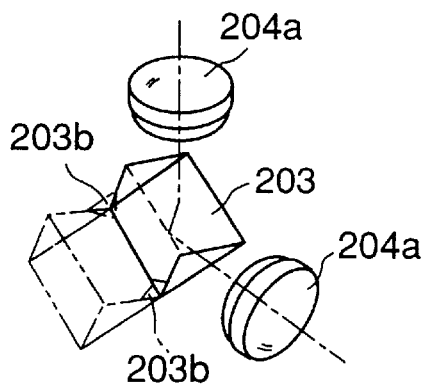
Figure 29F:
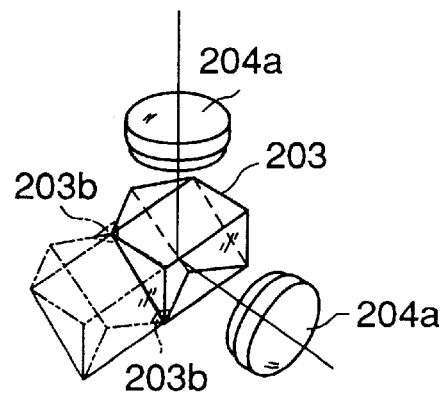

In an embodiment shown in FIG. 29B, the focusing optical system which is connected to the roof lens array 203 is formed of a prism array 205 and focusing elements 204a. In an embodiment shown in FIG. 29C, the focusing optical system which is connected to the roof lens array 203 is formed of a prism array 205 and Fresnel lenses 204b. In embodiments shown in FIGS. 29D and 29E, the focusing optical system which is optically coupled to the roof lens array 203 is formed of lenses 204a.

The present invention is not limited to the aforementioned embodiments, and other variations and modifications may be made without departing from the scope of the claimed invention.

What is claimed is:

1. An imaging device comprising:

a first focusing element array on which rays from an object are incident, said first focusing element array having focusing elements which are optically equivalent;

a second focusing element array from which the rays are emitted toward an imaging surface, said second focusing element array being optically equivalent to said first focusing element array;

a roof mirror array located between said first focusing element array and said second focusing element array, said roof mirror array having ridge lines each of which are perpendicular to a direction in which focusing elements of said first focusing element array are arranged in line, said ridge lines being arranged at intervals equal to those at which the focusing elements are arranged in line; and an aperture array having apertures arranged so as to correspond to said first focusing element array, second focusing element array and roof mirror array.

2. An imaging device comprising:

a roof prism lens array having roof prism lenses, each of said roof prism lenses having:

a first focusing portion on which rays from an object is incident;

a second focusing portion from which the rays are emitted toward an imaging surface, said second focusing portion being optically equivalent to said first focusing portion; and a roof prism portion having surfaces which are connected to each other at an angle of 90° so that a ridge line is formed, said roof prism portion being arranged so that the ridge line intersects optical axes of said first focusing portion and said second focusing portion at a position on a plane including the optical axes, wherein said roof prism lenses are arranged in line in a direction perpendicular to the ridge line of the roof prism portion of each of said roof prism lenses; and an aperture array having apertures each of which faces the first or second focusing portion of one of said roof prism lenses of said roof prism lens array.

3. An imaging device comprising:

a roof prism lens array having roof prism lenses, each of said roof prism lenses having:

a focusing element portion having a first portion on which rays from an object are incident and a second portion from which the rays are emitted toward an imaging surface, said first portion and said second portion having focusing characteristics optically equivalent, directions of optical axes of said first portion and said second portion being different from each other; and a roof prism portion having surfaces which are connected to each other at an angle of 90° so that a ridge line is formed, said roof prism portion being arranged so that the ridge line intersects the optical axes of said first and second portions of said focusing element portion at a position on a plane including the optical axes, wherein said roof prism lenses are arranged in line in a direction perpendicular to the ridge line of the roof prism portion of each of said roof prism lenses; and an aperture array having apertures each of which faces the first or second portion of said focusing element of one of said roof prism lenses of said roof prism lens array.

4. An imaging device comprising:

a focusing element; and a roof mirror having reflection surfaces which are connected to each other at an angle of 90° so that a ridge line is formed, wherein said focusing element and said roof mirror are arranged so that an optical axis of said focusing element intersects the ridge line at an angle less than 90° and rays from an object travel through said focusing element and are reflected by said roof mirror and then focused on an imaging surface.

5. An imaging device comprising:

a focusing element; and a roof prism having reflection surfaces which are connected to each other at an angle of 90° so that a ridge line is formed, wherein said focusing element and said roof prism are arranged so that an optical axis of said focusing element intersects the ridge line at an angle less than 90° and rays from an object travel through said focusing element and are reflected by said roof prism and then focused on an image surface.

6. An imaging device comprising:

a focusing element array having focusing elements which are optically equivalent and arranged in line;

a roof mirror array having roof mirrors which are optically equivalent, each of said roof mirrors having reflection surfaces connected to each other at an angle of 90° so that a ridge line is formed, said roof mirrors being arranged in line in a direction perpendicular to the ridge line of each of said roof mirrors so as to correspond to said focusing elements of said focusing element array, wherein said focusing element array and said roof mirror array are arranged so that an optical axis of each of said focusing elements intersects the ridge line of a corresponding one of said roof mirrors at an angle less than 90° and rays from an object travel through each of said focusing elements and are reflected by a corresponding one of said roof mirror and are then focused on an image surface.

7. An imaging device comprising:

a lens array having lenses which have optically equivalent focusing characteristics and are arranged in line; and a roof prism lens array having roof prisms which are optically equivalent, each of said roof prisms having reflection surfaces connected to each other at an angle of 90° so that a ridge line is formed, said roof prisms being arranged in line in a direction perpendicular to the ridge line of each of said roof prisms so as to correspond to said lenses of said lens array, wherein said lens array and said roof prism lens array are arranged so that an optical axis of each of said lenses intersects the ridge line of a corresponding one of said roof prisms at an angle less than 90° and rays from an object travel through each of said lenses and are reflected by a corresponding one of said roof prisms and are then focused on an image surface.

8. An imaging device comprising:

a focusing element array having focusing elements which are optically equivalent and arranged in line;

a roof mirror array having roof mirrors which are optically equivalent and arranged in line so as to correspond to said focusing elements of said focusing element array, said focusing element array and said roof mirror array being arranged so that an optical axis of each of said focusing elements intersects a ridge line of a corresponding one of said roof mirrors; and a regular reflection preventive structure provided in at least some of ridge line portions, between arranged optical axes, of said roof mirrors of said roof mirror array, said regular reflection preventive structure reducing an amount of light which is incident on a focusing element, reflected by a corresponding roof mirror and emitted from an optical system adjacent to said focusing element.

9. The imaging device as claimed in claim 8, wherein one of a flat surface, a polygonal surface and a curved surface is formed as said regular reflection preventive structure in each of said ridge line portions of said roof mirrors.

10. The imaging device as claimed in claim 8, wherein a rough surface is formed as said regular reflection preventive structure in each of said ridge line portions.

11. The imaging device as claimed in claim 8, wherein said regular reflection preventive structure has a light absorbing member which absorbs the light.

12. An imaging device comprising:

a focusing element array having focusing elements which are optically equivalent and arranged in line;

a roof prism array having roof prisms which are optically equivalent and arranged in line so as to correspond to said focusing elements of said focusing element array, each of said roof prisms having reflection surfaces which are connected to each other at an angle of 90° so that a ridge line is formed, said focusing element array and said roof prism array being arranged so that an optical axis of each of said focusing elements intersects a ridge line of a corresponding one of said roof prisms and a regular reflection preventive structure provided in at least some of root portions, between arranged optical axes, of said roof prisms of said roof mirror prism array, said regular reflection preventive structure reducing an amount of light which is incident on a focusing element, reflected by a corresponding roof prism and emitted from an optical system adjacent to said focusing element, said regular reflection preventive structure having a transparent member having a refractive index which is substantially equal to a refractive index of said roof prisms.

13. An imaging device comprising:

a roof prism array having roof prisms which are optically equivalent and arranged in line perpendicular to root lines of said roof prisms, each of said roof prisms having reflection surfaces which are connected to each other at an angle of 90° so that a corresponding one of the root lines is formed;

focusing elements which are optically equivalent, one of said focusing elements being provide in a portion of each of said roof prisms on which rays are incident, another of said focusing elements being provided in a portion of each of said roof prisms from which the rays are emitted, each of the ridge line portions of said roof prisms intersecting an axes of corresponding focusing elements; and a regular reflection preventive structure provided in at least some of root portions, between arranged optical axes, of said roof prisms of said roof prism array, said regular reflection preventive structure reducing an amount of light which is incident on a focusing element, reflected by a corresponding roof mirror prism and emitted from an optical system adjacent to said focusing element, said regular reflection preventive structure having a transparent member having a refractive index which is substantially equal to a refractive index of said roof mirror prisms.

* * * * *